(12) United States Patent
Chaddha

(10) Patent No.: US 6,404,923 B1
(45) Date of Patent: *Jun. 11, 2002

(54) TABLE-BASED LOW-LEVEL IMAGE CLASSIFICATION AND COMPRESSION SYSTEM

(75) Inventor: Navin Chaddha, Stanford, CA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/625,650

(22) Filed: Mar. 29, 1996

(51) Int. Cl.[7] .............................. G06K 9/62; G06T 9/40
(52) U.S. Cl. ........................ 382/224; 382/240; 382/253
(58) Field of Search ................................ 382/224, 227, 382/251, 253, 240

(56) References Cited

U.S. PATENT DOCUMENTS

| | | | |
|---|---|---|---|
| 4,987,480 A | | 1/1991 | Lippman et al. ............... 358/13 |
| 5,060,285 A | | 10/1991 | Dixit et al. .................... 382/56 |
| 5,142,593 A | * | 8/1992 | Kasano ......................... 382/170 |
| 5,144,425 A | | 9/1992 | Joseph ......................... 358/133 |
| 5,239,594 A | * | 8/1993 | Yoda ............................ 382/158 |

(List continued on next page.)

OTHER PUBLICATIONS

Luttrell. "Hierarchical Vector Quantisation (Image Compression)." IEE Proceedings, Communications, Speech and Vision, vol. 136, No. 6, pp. 405–413, Dec. 1989.*

Cosman et al. "Using Vector Quantization for Image Processing." Proceedings of the IEEE, vol. 81, No. 9, pp. 1326–1341, Sep. 1993.*

McLean. "Vector Quantization for Texture Classification." IEEE Transactions of Systems, Man and Cybernetics, vol.23, No. 3, pp. 637–649, May 1993.*

(List continued on next page.)

Primary Examiner—Jon Chang
(74) Attorney, Agent, or Firm—Lee & Hayes, PLLC

(57) ABSTRACT

A system for classifying image elements comprising means for converting an image into a series of vectors and a hierarchical lookup table that classifies the vectors. The lookup table implements a pre-computed discrete cosine transform (DCT) to enhance classification accuracy. The hierarchical lookup table includes four stages: three of which constitute a preliminary section; the fourth stage constitutes the final section. Each stage has a respective stage table. The method for designing each stage table comprises a codebook design procedure and a table fill-in procedure. Codebook design for the preliminary stages strives to minimize a classification-sensitive proximity measure; codebook design for the final stage attempts to minimize Bayes risk of misclassification. Table fill-in for the first stage involves generating all possible input combinations, concatenating each possible input combination to define a concatenated vector, applying a DCT to convert the address vector to the spatial frequency domain, finding the closest first-stage codebook vector, and assigning to the address the index associated that codebook vector. Table fill-in for subsequent stages involves decoding each possible input combination to obtain spatial frequency domain vectors, applying an inverse DOC to convert the inputs to pixel domain vectors, concatenating the pixel domain vectors to obtain a higher dimension pixel domain vector, applying a DCT to obtain a spatial frequency domain vector, finding the closest same-stage codebook vector, and assigning the codebook vector index to the input combination.

27 Claims, 4 Drawing Sheets

U.S. PATENT DOCUMENTS

| | | | | |
|---|---|---|---|---|
| 5,282,255 | A | | 1/1994 | Bovik et al. ................... 382/56 |
| 5,341,441 | A | * | 8/1994 | Maeda et al. ................ 382/253 |
| 5,351,095 | A | | 9/1994 | Kerdranvat ................. 348/699 |
| 5,371,544 | A | | 12/1994 | Jaquin et al. ............... 348/398 |
| 5,414,469 | A | | 5/1995 | Gonzales et al. ........... 348/408 |
| 5,418,568 | A | | 5/1995 | Keith .......................... 348/390 |
| 5,444,800 | A | * | 8/1995 | Kim ............................ 382/239 |
| 5,453,801 | A | | 9/1995 | Kim ............................ 348/699 |
| 5,473,379 | A | | 12/1995 | Horne ......................... 348/416 |
| 5,481,543 | A | | 1/1996 | Veltman .................... 370/94.1 |
| 5,502,492 | A | | 3/1996 | Jung ........................... 348/413 |
| 5,512,938 | A | | 4/1996 | Ohno ........................... 348/15 |
| 5,512,952 | A | | 4/1996 | Iwamura ..................... 348/416 |
| 5,521,918 | A | | 5/1996 | Kim ............................. 370/61 |
| 5,521,988 | A | * | 5/1996 | Li et al. ...................... 382/248 |
| 5,537,155 | A | | 7/1996 | O'Connell et al. .......... 348/699 |
| 5,557,341 | A | | 9/1996 | Weiss et al. ................ 348/699 |
| 5,560,038 | A | | 9/1996 | Haddock ..................... 395/800 |
| 5,576,767 | A | | 11/1996 | Lee et al. .................... 348/413 |
| 5,585,852 | A | | 12/1996 | Agarwal ...................... 348/398 |
| 5,592,228 | A | | 1/1997 | Dachiku et al. ............. 348/416 |
| 5,602,589 | A | | 2/1997 | Vishwanath et al. ........ 348/398 |
| 5,604,867 | A | | 2/1997 | Harwood ............... 395/200.13 |
| 5,623,312 | A | | 4/1997 | Yan et al. .................... 348/416 |
| 5,623,313 | A | | 4/1997 | Naveen ....................... 348/416 |
| 5,673,265 | A | | 9/1997 | Gupta et al. ................. 370/432 |
| 5,692,012 | A | * | 11/1997 | Virtamo et al. ............. 382/253 |
| 5,694,173 | A | | 12/1997 | Kimura et al. .............. 348/423 |
| 5,768,533 | A | | 6/1998 | Ran ...................... 395/200.77 |
| 5,859,667 | A | | 1/1999 | Kondo et al. ................ 348/414 |
| 5,859,932 | A | | 1/1999 | Etoh ........................... 382/253 |

OTHER PUBLICATIONS

Califano et al. "Multidimensional Indexing for Recognizing Visual Shapes." IEEE Transactions on Pattern Analysis and Machine Intelligence, vol. 16, No.4, pp. 373–392, Apr. 1994.*

Vishwanath. "Algorithms and Architectures for Hierarchical Compression of Video." Proceedings of International Conference on Application Specific Array Processors, pp. 10–21, Aug. 1994.*

Kubrick et al. "Classified Vector Quantization of Images: Codebook Design Algorithm." IEE Proceedings, Communications, Speech and Vision, vol. 137, No.6, pp. 379–386, Dec. 1990.*

Massen. "Multisensorial Cameras in Industrial Qualitty Inspection." AT'95, Advanced Technologies, Intelligent Vision, 1995, pp. 23–26, Oct. 1995.*

Chaddha, N., et al., "Hierarchical Vector Quantization of Perceptually Weighted Block Transforms", *IEEE*, pp. 3–12, (1995).

Chaddha et al., "A Frame–work for Live Multicast of Video Streams over the Internet", IEEE, 1996, pp. 1–4.

Gersho et al., Vector Quantization and Signal Compression, Kluwer Academic Publishers 1991, pp. 420–421.

Linde et al., "An Algorithm for Vector Quantizer Design", IEEE Transactions on Communications, vol. COM–28, No., Jan. 1980, pp. 84–95.

Nasrabadi, "Image Coding Using Vector Quantization: A Review", Reprinted from IEEE Trans. Commun., vol. COM–36, Aug. 1988, pp. 957–971.

Ho et al., "Variable–Rate Multi–Stage Vector Quantization for Image Coding", IEEE, 1988, pp. 1156–1159.

Chou et al., "Optimal Pruning with Applications to Tree–Structured Source Coding and Modeling", IEEE Transactions on Information Theory, vol. 35, No. 2, Mar. 1989, pp. 299–315.

Chaddha et al., "An End to End Software Only Scalable Video Delivery System", Proceedings Networks and Operating System Support for Digital Audio and Video, Apr. 1995, Durham, NH, pp. 130–141.

Katsavounidis et al., "Hierarchical Weighted Vector Quantization (HWVQ) for Embedded Wavelet Coding," Proceedings of the SPIE—The International Society for Optical Engineering, 1996, vol. 2727, Mar. 17–20, 1996, pp 548–559.

Mehrotra et al., "Predictive Hierarchical Table–Lookup Vector Quantization with Quadtree Encoding" Proceedings International Conference on Image Processing, vol. 3, 1996, pp. 407–410.

Rijkse, "H.263: Video Coding for Low–Bit–Rate Communication", IEEE Communications Magazine, Dec. 1996, pp. 42–45.

Chaddha et al., "Constrained and Recursive Hierarchical Table–Lookup Vector Quantization", IEEE, 1996, pp. 220–229.

Yang et al., "Motion Compensated Wavelet Transform Code for Very Low Bit–Rate Visual Telephony", Signal Processing: Image Communication, vol. 7, 1995, pp. 581–592.

* cited by examiner

TABLE-BASED LOW-LEVEL IMAGE CLASSIFICATION AND COMPRESSION SYSTEM

BACKGROUND OF THE INVENTION

The present invention relates to digital image analysis and, more particularly, to a low-level digital image classification system. A major objective of the present invention is to provide for fast, effective, low-level image classification that can be implemented with reduced hardware/software requirements.

Humans engage in image classification whenever they look at an image and identify objects of interest. In images, humans readily distinguish: humans from other objects, man-made features from natural features, and text from graphics, etc. With specialized training, humans are adept at recognizing significant features in specialized images such as satellite weather images and medical tomographic images.

Suitably equipped machines can be programmed and/or trained for image classification, although machine recognition is less sophisticated than human recognition in many respects. Computerized tomography uses machine classification to highlight potential tumors in tomographic images; medical professionals examining an image for evidence of tumors take advantage of the highlighting to focus their examination. Machine classification is also used independently; for example, some color printer drivers classify image elements as either text or graphics to determine an optimal dithering strategy for simulating full-range color output using a limited color palette.

Most machine image classification techniques operate on digital images. Digital images are typically expressed in the form of a two-dimensional array of picture elements (pixels), each with one (for monochromatic images) or more (for color images) values assigned to it. Analog images to be machine classified can be scanned or otherwise digitized prior to classification.

The amount of computational effort required for classification scales dramatically with the number of pixels involved at once in the computation. The number of pixels is the product of image area and image resolution, i.e., the number of pixels per unit area. As this suggests, faster classification can be achieved using lower resolution images, and by dividing an image into small subimages that can be processed independently; the total computation involved in classifying the many subimages can be considerably less burdensome than the computation involved in classifying an image as a whole. On the other hand, if the subimages are too small to contain features required for classification, or if the resolution is too low for relevant features to be identified, classification accuracy suffers.

Successful "low-level" classification techniques depend on finding suitable tradeoffs between accuracy and computational efficiency in the selection of image resolution and in subimage area. In general, subimage area can be imposed by the classification technique, whereas resolution is typically a given. In such cases, subimage area is typically selected to be the minimum required for acceptably accurate classification. The selected subimage area then determines the number of pixels per subimage, and thus the amount of computation required for classification.

When image resolution is optimal for classification, the number of pixels required per subimage can be surprising small. For example, 8×8-pixel subimages are typically sufficient for distinguishing text from graphics; 4×4-pixel subimages are typically sufficient to distinguish man-made from natural objects in an aerial image; and 2×2-pixel subimages can be used to distinguish potential tumors from healthy tissue in a computerized tomographic image. Of course, subimages with greater numbers of pixels must be used if the image resolution is greater than optimal for classification purposes.

Low-level classification strives to assign each subimage to a class. Ideally, the assignment would be error free. When this cannot be done, the goal is to minimize the likelihood of error, or, if some errors are more costly than others, minimize the average cost of the errors. Bayes decision theory and related statistical approaches are used to achieve the goals. The computations that are required must be iterated for each block. While it is reduced relative to full-view classification, the amount of computation required for low-level classification can still be excessive.

Technological progress has provided both more powerful computers and more efficient image classification techniques. Rather than satisfy the demand for efficient image classification, these advances have fueled demand by proliferating the use of computerized images and raising expectations for real-time image processing.

Recent developments on the Internet, particularly, the World Wide Web, illustrate the demand for communication of images, particularly in high-bandwidth applications such as interactive video and video conferencing. Internet providers targeting a large audience often must transmit not only the images but also applications, e.g., browsers, for viewing and interacting with the images. The unsophisticated consumers of these images are often not tolerant of delays that might be involved in any classification activities associated with these images. Furthermore, the image providers cannot assume that their consumers will have hardware dedicated to the classification activities, nor can the providers conveniently distribute such dedicated hardware.

Thus, there is an increasing need for more efficient image classification techniques. Preferably, such techniques would achieve high performance even in software implementations that require only a fraction of the processing power available on inexpensive home and desktop computers. When embodied as software, the techniques should be readily distributed by image providers. Whether hardware or software based (or both), improved image classification techniques are desired to enhance all the applications that depend on them.

SUMMARY OF THE INVENTION

The present invention provides an image classification system comprising means for converting an image into vectors and a lookup table for converting the vectors into class indices. Each class index corresponds to a respective class of interest. Performing classification using tables obviates the need for computations, allowing higher classification rates.

The lookup table can be single-stage or multi-stage; a multi-stage lookup table permits classification to be performed hierarchically. The advantage of the multi-stage table is that the memory requirements for storing the table are vastly reduced at the expense of a small loss of classification accuracy.

Multi-stage tables typically have two to eight stages. Only the last stage table operates on blocks of the size selected to allow acceptably accurate classification. Each preceding stage operates on smaller blocks than the succeeding stage. The number of stages is thus related to the number of pixels per block.

For example, a four-stage table can be used to classify 4×4 pixel blocks. For each 4×4 image block, the first stage can process sixteen individual pixels in pairs to yield eight indices corresponding to eight respective 2×1 pixel blocks. The second stage can convert the eight 2×1 blocks indices to four 2×2 block indices. The third stage can convert the four 2×2 block indices to two 4×2 block indices. The fourth stage can convert the two 4×2 block indices to one 4×4 block classification index.

In this example, each stage processes inputs in pairs. For each 4×4 image vectors, the first stage processes eight pairs of pixels. This can be accomplished using eight first-stage tables, or by using one first-stage table eight times, or by some intermediate solution. In practice, using a single table eight times affords sufficient performance with minimal memory requirements. Likewise, for the intermediate stages, a single table can be used multiple times per image vector for fast and efficient classification. Note that the number of stages can be reduced by increasing the number of inputs per table; for example, using four inputs per table halves the number of stages required, but greatly increases the total memory required for the multi-stage table.

In most cases, the pixel domain in which an image is expressed is not optimum for accurate classification. For example, more accurate classification can often be achieved when the image is transformed into a spatial frequency domain. While the invention applies to vectors transformed to another domain prior to entry into a lookup table, the invention further provides for the transform to be performed by the classification table itself so that there is no computation required.

The method for designing the classification lookup tables includes a codebook design procedure and a table fill-in procedure for each stage. For each stage, the codebook design procedure involves clustering a statistically representative set of vectors so as to minimize some error metric. The vectors are preferably expressed in the domain, e.g., pixel or spatial frequency, most useful for the classification of interest. The dimensionality of the vectors is dependent on the stage and the number of inputs to that stage and preceding stages. For preliminary stages, the error metric is a proximity measure, preferably weighted to preserve information relevant to classification. For the final stage, the preferred error metric takes Bayes risk, i.e., risk of classification error, into account; the Bayes risk can be weighted to reflect differential costs of classification errors.

The statistically representative set of vectors can be obtained by selecting a set of training images that match as closely as possible the statistical profiles of the images to be classified. If the images to be classified involve only aerial photographs of terrain, the training images can be aerial photographs of terrain. If the images to be classified vary considerably in content, so should the training images.

The training images are divided into blocks, which are in turn expressed as vectors. The dimensionality of blocks and vectors is stage dependent. The first-stage input blocks are 1×1, so the corresponding vectors are one-dimensional. For each stage, the inputs are concatenated according to the number of stage table inputs. For a first-stage table with two inputs, two 1×1 blocks are concatenated to form a 2×1 block; the corresponding vector is two-dimensional. If the classification is to be performed in a domain other than a pixel domain, the post-concatenation vectors are transformed into that domain. The vectors are then processed according to a LBG/GLA algorithm to yield codebook vectors according to the selected error metric.

The codebook vectors are assigned indices. For preliminary-stage tables, the indices are preferably fixed-length; these indices represent codebook vectors. For a last stage of a multi-stage classification table or the only table of a single-stage classification table, the indices represent classes. If there are only two classes, a single bit classification index can be used. If there are more than two classes, more bits on the average are required for the index. In this case, the index can be fixed-length or variable. A variable-length index can be used to represent classification more compactly where the distribution of image vectors to codebook vectors is nonuniform. To optimize the variable-length code, the error metric for the last-stage codebook design can be subject to an entropy constraint. In any event, the number of classes should be less than or equal to the dimensionality of the image vectors to ensure sufficiently accurate classification.

Once a codebook is designed for a stage, the table fill-in procedure can be executed. In this procedure, the set of all possible combinations of inputs to a stage table define its addresses. The purpose of this procedure is to assign same-stage codebook indices to each of these address so as to optimize classification accuracy.

In the case of a first-stage table, individual pixel inputs are concatenated to define an input vector in the pixel domain. If the classification is to be performed in a domain other than the pixel domain, this vector is transformed accordingly (so that it is in the same domain as the codebook vectors). Each address vector is mapped to the closest codebook vector. While a weighted proximity measure can be used, better results are obtained using an objective proximity measure.

In the case of second and succeeding-stage tables, the inputs are indices representing codebook vectors for the preceding stage. These must be decoded to yield previous-stage codebook vectors to which a proximity measure can be applied. If the classification is to be performed in a pixel domain, the previous-stage codebook vectors are in the pixel domain. They can be concatenated to match the dimensionality of the same-stage codebook vectors. A suitable proximity measure is used to determine the codebook closest to each concatenated address vector. The index associated with the closest codebook vector is assigned to the concatenated address vector.

The procedure for second and succeeding stages must be modified if the classification is to be performed in other than the pixel domain. In that case, the decoded indices are previous-stage codebook vectors in the other domain. An inverse transform is applied to convert these to the pixel domain to permit concatenation. The concatenated pixel-domain vector is then transformed to the other domain, in which the proximity measure is applied to determine a closest same-stage codebook vector. The index is assigned as before. When the codebook design is completed for all stages and the table fill-in procedure has been completed for all addresses of all stage tables, design of a multistage table is complete. In the case of a single-stage classification table, the codebook design procedure is similar to that for the last stage of a multi-stage table, while the table fill-in procedure is similar to that for the first stage of a multi-stage classification table.

The invention further provides that the table used for classification has other concurrent uses. For example, the tables can be used for joint classification and compression. In these cases, the output can be a pair of indices, one for classification and another for codebook vector. Alternatively, a single codebook vector index can be output and a decoder can assign the class during decompression.

When the table is dual purpose, it can be desirable to use codebook measures that are not optimized for classification. For example, measures optimized for image reconstructed may be used in place of measure optimized for classification, if fidelity of the reconstructed image is of paramount importance. Otherwise, a weighted combination of classification-optimized and compression-optimized measures can be used in codebook design. In particular, last-stage codebook design can use a weighted combination of perceptual proximity and weighted risk of misclassification.

In accordance with the foregoing, the present invention permits low-level block-based image classification to be performed without computation. As a result, classification can be performed in software at rates formerly requiring greater general computer power or dedicated image processing hardware. Since the tables can be embodied in software, they can be readily distributed, e.g., over the Internet, so that they can be used locally on images selected by a receiver. Furthermore, the invention allows classification to be performed in a domain other than a pixel domain, where the block-based transformation is designed into the classification table so that no computations are required during image processing. In addition, the invention provides for multi-use tables, such as those for joint classification and compression. These and other features and advantages of the invention are apparent from the description below with reference to the following drawings.

DESCRIPTION OF THE PREFERRED EMBODIMENTS

Figure 1:
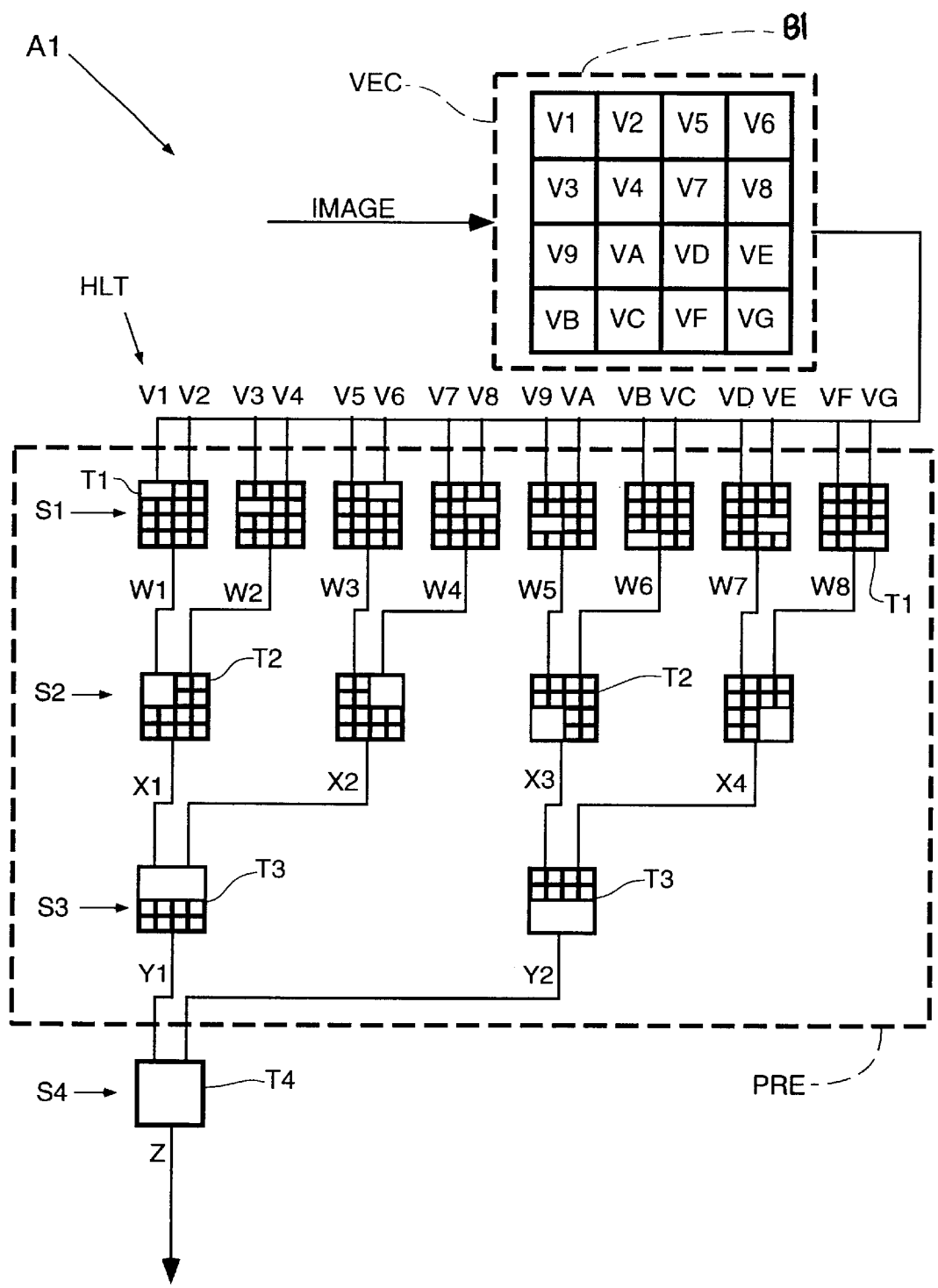
FIG. 1 is a schematic illustration of an image classification system in accordance with the present invention.

In accordance with the present invention, a low-level image classification system A1 comprises a vectorizer VEC and a hierarchical lookup table HLT, as shown in FIG. 1. Vectorizer VEC converts a digital image into a series of image vectors. Hierarchical lookup table HLT converts the series of vectors into a series of classification indices.

Vectorizer VEC effectively divides an image into blocks Bi of 4×4 pixels, where i is a block index varying from 1 to the total number of blocks in the image. If the original image is not evenly divisible by the chosen block size, additional pixels can be added to sides of the image to make the division even in a manner known in the art of image analysis. Each block is represented as a 16-dimensional vector Ii=(Vij) where j is a dimension index ranging from one to sixteen (1–G, septadecimal) in the order shown in FIG. 1 of the pixels in block Bi. Since only one block is illustrated in FIG. 1, the "i" index is omitted from the vector values in FIG. 1 and below.

Each vector element Vj is expressed in a suitable precision, e.g., eight bits, representing a monochromatic (color or gray scale) intensity associated with the respective pixel. Vectorizer VEC presents vector elements Vj to hierarchical lookup table HLT in adjacently numbered odd-even pairs (e.g., V1, V2) as shown in FIG. 1.

Hierarchical lookup table HLT includes four stages S1, S2, S3, and S4. Stages S1, S2, and S3 collectively constitute a preliminary section PRE of hierarchical lookup table HLT, while fourth stage S4 constitutes a final section. Each stage S1, S2, S3, S4, includes a respective stage table T1, T2, T3, T4. In FIG. 1, the tables of the preliminary section stages S1, S2, and S3 are shown multiple times to represent the number of times they are used per image vector. For example, table T1 receives eight pairs of image vector elements Vj and outputs eight respective first-stage indices Wj. If the processing power is affordable, a stage can include several tables of the same design to that the pairs of input values can be processed in parallel.

The purpose of hierarchical lookup table is to map each image vector many-to-one to a set of class indices. Note that the total number of distinct image vectors is the number of distinct values a vector value Vj can assume, in this case $2^8=256$, raised to the number of dimensions, in this case sixteen. It is impractical to implement a table with $256^{16}$ entries. The purpose of preliminary section PRE is to reduce the number of possible vectors that must be classified with minimal loss of information relevant to the classification of interest. The purpose of final-stage table T4 is to map the reduced number of vectors many-to-one to class indices. Table T4 has $2^{16}$ entries corresponding to the concatenation of two eight-bit inputs. Tables T1, T2, and T3 are the same size as table T4, so that total table size of hierarchical vector table HLT is $4 \times 2^{16}=262,144$, which is a practical number of table entries.

Each stage table T1, T2, T3, T4 has two inputs and one output. Pairs of image vector elements Vj serve as inputs to first-stage table T1. The vector elements can represent values associated with respective pixels of an image block. However, the invention applies as well if the vector elements Vj represent an array of values obtained after a transformation on an image block. For example, the vector elements can be coefficients of a discrete cosine transform applied to an image block. On the other hand, it is computationally more efficient to embody a precomputed transform in the hierarchical lookup table than to compute the transform for each block of each image being classified. Accordingly, in the present case, each input vector is in the pixel domain. In other words, each vector value Vj is treated as representing a monochrome intensity value for a respective pixel of the associated image block.

Each pair of vector values (Vj, V(j+1)) represents with a total of sixteen bits a 2×1 (column×row) block of pixels. For example, (V1, V2) represents the 2×1 block highlighted in the leftmost replica of table T1 in FIG. 1. Table T1 maps pairs of vector element values many-to-one to eight-bit first-stage indices Wj; in this case, j ranges from 1 to 8. Each eight-bit Wj also represents a 2×1-pixel block. However, the precision is reduced from sixteen bits to eight bits. For each image vector, there are sixteen vector values Vj and eight first-stage indices Wj.

The eight first-stage indices Wj are combined into four adjacent odd-even second-stage input pairs; each pair (Wj, W(j+1)) represents in sixteen-bit precision the 2×2 block constituted by the two 2×1 blocks represented by the individual first-stage indices Wj. For example, (W1,W2) represents the 2×2 block highlighted in the leftmost replica of table T2 in FIG. 1. Second-stage table T2 maps each second-stage input pair of first-stage indices many-to-one to a second-stage index Xj. For each image input vector, the eight first-stage indices yield four second-stage indices X1, X2, X3, and X4. Each of the second-stage indices Xj represents a 2×2 image block with eight-bit precision.

The four second-stage indices Xj are combined into two third-stage input pairs (X1,X2) and (X3,X4), each representing a 4×2 image block with sixteen-bit precision. For example, (X1,X2) presents the upper half block highlighted in the left replica of table T3, while (X3,X4) represents the lower half block highlighted in the right replica of table T3 in FIG. 1. Third-stage table T3 maps each third-stage input pair many-to-one to eight-bit third-stage indices Y1 and Y2. These two indices are the output of preliminary section PRE in response to a single image vector.

The two third-stage indices are paired to form a fourth-stage input pair (Y1,Y2) that expresses an entire image block with sixteen-bit precision. Fourth-stage table T4 maps fourth-stage input pairs many-to-one to classification indices Z. Z is a one-bit index distinguishing two classes. If more classes are to be distinguished, a variable-length precision or a greater precision fixed-length index can be used. The specific relationship between inputs and outputs is shown in Table I below as well as in FIG. 1.

TABLE I

| Lookup Table | Inputs | Output |
|---|---|---|
| T1 | V1, V2 | W1 |
| " | V3, V4 | W2 |
| " | V5, V6 | W3 |
| " | V7, V8 | W4 |
| " | V9, VA | W5 |
| " | VB, VC | W6 |
| " | VD, VE | W7 |
| " | VF, VG | W8 |
| T2 | W1, W2 | X1 |
| " | W3, W4 | X2 |
| " | W5, W6 | X3 |
| " | W7, W8 | X4 |
| T3 | X1, X2 | Y1 |
| " | X3, X4 | Y2 |
| T4 | Y1, Y2 | Z |

Figure 2A:
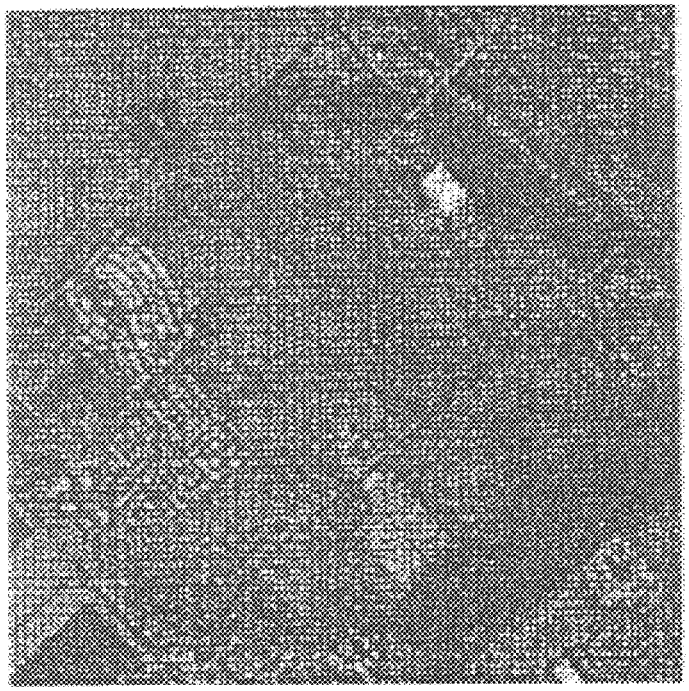
FIG. 2A is an aerial photograph used as an input to the system of FIG. 1.
Figure 2B:
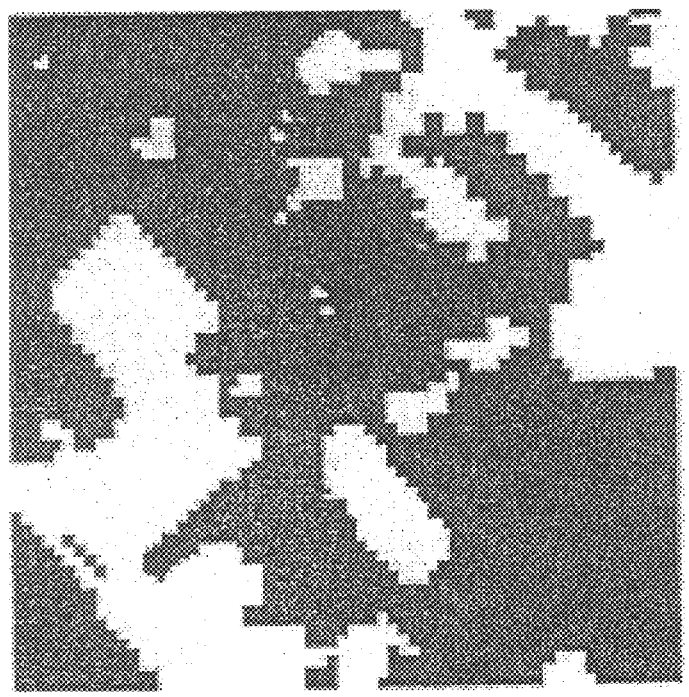
FIG. 2B is a classification map of the aerial photograph of FIG. 2A.

For an entire image, there are many image vectors Ii, each yielding a respective classification index Zi. Classification indices Zi can be used to generate a classification map for the original image. For example, FIG. 2A is a 512×512 pixel aerial photo of terrain including both man-made and natural objects. Image classification system A1 can classify 16,384 4×4 blocks of pixels as indicating man-made or natural objects. The classification map for the aerial image is shown in FIG. 2B in which natural objects are dark and man-made objects are shown light.

Figure 3A:
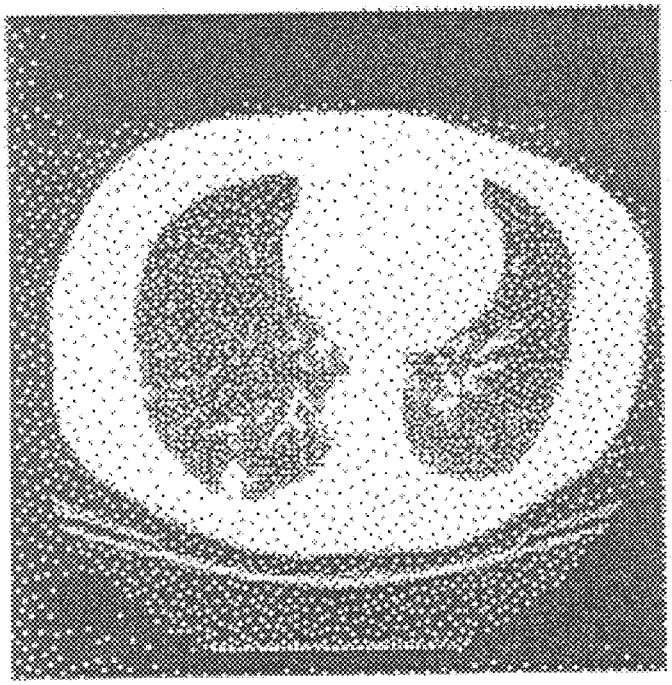
FIG. 3A is a computerized tomographic image used as an input to an alternative image classification system in accordance with the present invention.
Figure 3B:
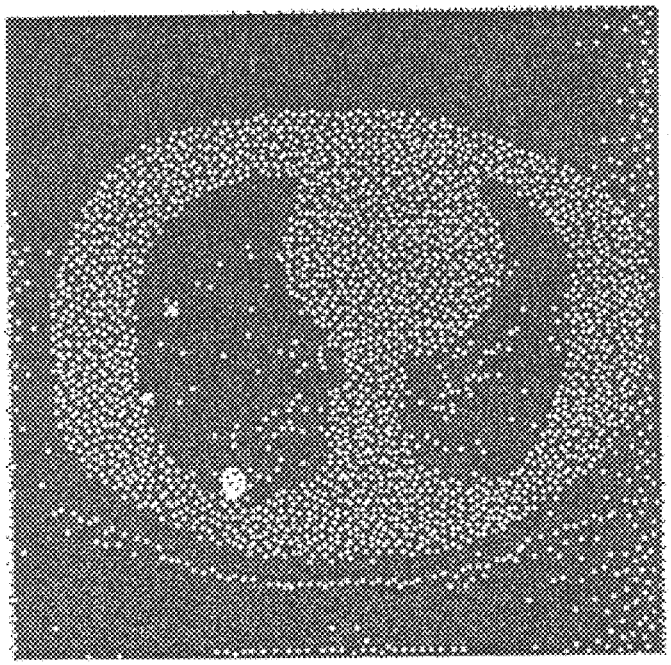
FIG. 3B is a classification map of the computerized tomographic image of FIG. 3A.

FIG. 3A is a computerized tomography image such as those used for medical purposes to identify tumors. FIG. 3B is a classification map of the image of FIG. 3A. For this image, the block size is 2×2. The classification system has only two stages. The first stage accepts two pairs of vector elements and outputs two indices. The second stage accepts the two first-stage indices and outputs a 2-bit classification index to represent three classes. One class is background, gray in FIG. 3B, to provide a context for the other two classes. Healthy tissue is depicted in black while potential tumors are depicted in white in FIG. 3B. Alternatively, the classification could be performed by a one-stage classification table with four inputs.

Figure 4:
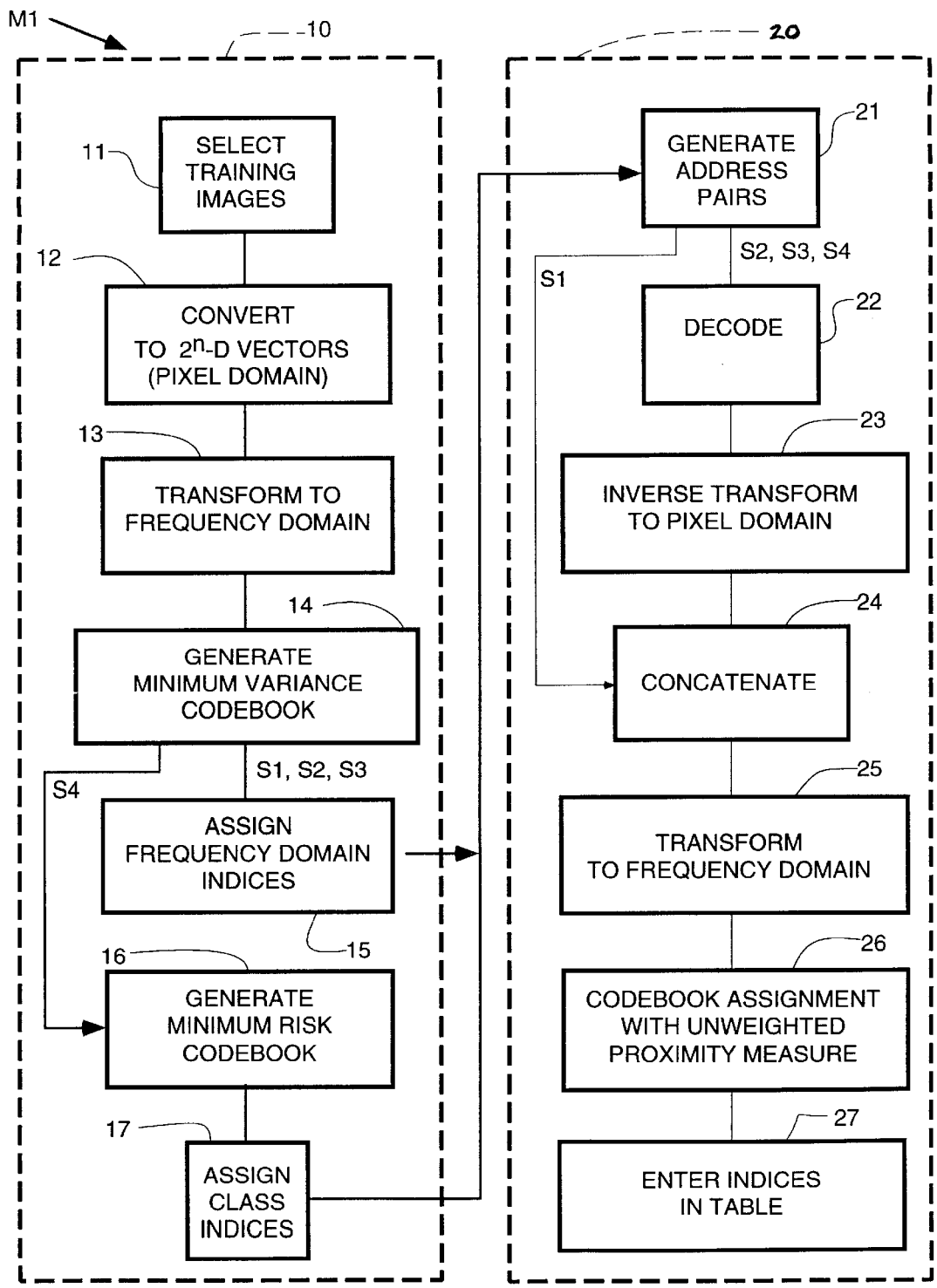
FIG. 4 is a flow chart of a method of constructing the system of FIG. 1.

A table design method M1, flow charted in FIG. 4, is executed for each stage of hierarchical lookup table HLT, with some variations depending on whether the stage is the first stage, S1, an intermediate stage S2, S3, or the final stage S4. For each stage, method M1 includes a codebook design procedure 10 and a table fill-in procedure 20. For each stage, fill-in procedure 20 must be preceded by the respective codebook design procedure 10. However, there is no chronological order imposed between stages; for example, table T3 can be filled in before the codebook for table T2 is designed.

For first-stage table T1, codebook design procedure 10 begins with the selection of training images at step 11. The training images are selected to be representative of the type or types of images to be classified by system A1. If system A1 is used for general purpose image classified, the selection of training images can be quite diverse. If system A1 is used for a specific type of image, e.g., terrain, then the training images can be a selection of terrain images. A narrower set of training images allows more faithful image reproduction for images that are well matched to the training set, but less faithful image reproduction for images that are not well matched to the training set.

The training images are divided into 2×1 blocks, which are represented by two-dimensional vectors (Vj,V(J+1)) in a spatial pixel domain at step 12. For each of these vectors, Vj characterizes the intensity of the left pixel of the 2×1 block and V(J+1) characterizes the intensity of the right pixel of the 2×1 block.

In alternative embodiments of the invention, codebook design and table fill in are conducted in the spatial pixel domain. For these pixel domain embodiments, steps 13, 23, 25 are not executed for any of the stages. A problem with the pixel domain is that the terms of the vector are of equal importance: there is no reason to favor the intensity of the left pixel over the intensity of the right pixel, and vice versa. For table T1 to reduce data while preserving as much information relevant to classification as possible, it is important to express the information so that more important information is expressed independently of less important information.

For the design of the preferred first-stage table T1, a discrete cosine transform is applied at step 13 to convert the two-dimensional vectors in the pixel domain into two-dimensional vectors in a spatial frequency domain. The first value of this vector corresponds to the average intensities of the left and right pixels, while the second value of the vector corresponds to the difference in intensities between the left and right pixels.

From the perspective of a human perceiver, expressing the 2×1 blocks of an image in a spatial frequency domain divides the information in the image into a relatively important term (average intensity) and a relatively unimportant term (difference in intensity). An image reconstructed on the basis of the average intensity alone would appear less distorted than an image reconstructed on the basis of the left or right pixels alone; either of the latter would yield an image which would appear less distorted than an image reconstructed on the basis of intensity differences alone.

The fact that one term is more important than another for purposes of image reconstruction for human viewing does not necessarily make it ore important for purposes of classification. The point is that the terms of vector expression of an image block are more likely to vary in importance when the vector is in a spatial frequency domain than in a spatial pixel domain. Whenever such differences in importance can be determined, they can be used to help preserve relevant information in the face of data reduction.

The codebook is designed at step 14 in accordance with a splitting variation of the generalized Lloyd algorithm described by Y. Linde, A. Buzo, and R. M. Gray in "An algorithm for vector quantization Design", *IEEE Transactions on Communications*, COM-28:84–95, January, 1980, and referred to in *An Introduction to Data Compression* by Khalid Sayood, Morgan Kaufmann Publishers, Inc., San Francisco, Calif., 1996, pp. 222–228. This LBG/GLA algorithm utilizes an iterative procedure designed to reduce variance (other statistical measures can be used) in a selected proximity measure with each iteration. In general, the error does not reach zero; instead, the error reduction between successive iterations diminishes as the number of iterations increases. Typically, the iterations are stopped when the error reduction from one iteration to the next falls below a predetermined threshold.

The proximity measure employed at step 14 can be an unweighted measure, such as mean square error. However, more accurate classification can be achieved using a "classification-sensitive" error measure that is weighted to emphasize information relevant to the classification of interest. For example, if the difference value is more important for the purposes of classification than the average term, then the former can be given more weight than the latter. In addition, since this is vector rather than scalar quantization, interactive effects between the spatial frequency dimensions can be taken into account. For example, if the classification is more sensitive to difference information in bright image regions than in dark image regions, the error measure can be weighted accordingly.

It should be noted however, that classification can be performed jointly with compression using the same hierarchical lookup table. In general, a goal in compression is to permit an image constructed from the compressed data to appear to a human perceiver as much like the original image as possible. To this end, a perceptually weighted proximity measure is favored for codebook design. Where perceptual weighting and class-sensitive weighting differ significantly, the relative importance of the classification and compression functions must be considered. In some cases, a classification sensitive measure can be dispensed with in favor of a perceptually weighted measure to optimize fidelity of the reproduction image. In other cases, a weighted combination of classification-sensitive and perceptually weighted measures can be used in codebook design. As a default, an unweighted, i.e., "objective", proximity measure can be used.

The codebook designed in step 14 comprises a set of 2×1 frequency domain codebook vectors. The number of codebook vectors must be large enough to preserve a useful amount of relevant information and must be small enough to allow effective data reduction. Whatever the tradeoff, the number is preferably a power of two since that constraint maximizes the number of vectors that can be expressed for a given precision measured in bits. To this end, in the preferred embodiment, the set includes $2^8=256$ codebook vectors, each of which is assigned a respective eight-bit index at step 15. This completes codebook design section of method M1 for stage S1.

Fill-in procedure 20 for stage 1 begins with step 21 of generating each distinct address to permit its contents to be determined. In the preferred embodiment, values are input into each of the tables in pairs. In alternative embodiments, some tables or all tables can have more inputs. For each table, the number of addresses is the product of the number of possible distinct values that can be received at each input. Typically, the number of possible distinct values is a power of two. The inputs to table T1 receive an eight bit input VJ and eight-bit input V(J+1); the number of addresses for table T1 is thus $2^8*2^8=2^{16}=65{,}536$. The steps following step 21 are designed to enter at each of these addresses one of the $2^8=256$ table T1 indices Wj.

Each input Vj is a scalar value corresponding to an intensity assigned to a respective pixel of an image. These inputs are concatenated at step 24 in pairs to define a two-dimensional vector (VJ, V(J+1)) in a spatial pixel domain. (Steps 22 and 23 are bypassed for the design of first-stage table T1.)

For a meaningful proximity measurement, the input vectors must be expressed in the same domain as the codebook vectors, i.e., a two-dimensional spatial frequency domain. Accordingly, a DCT is applied at step 25 to yield a two-dimensional vector in the required spatial frequency domain.

The table T1 codebook vector closest to this input vector is determined at step 26. The proximity measure is unweighted mean square error. Better performance is achieved using an objective measure like unweighted mean square error as the proximity measure during table building rather than a perceptually weighted or class sensitive proximity measure. On the other hand, an unweighted proximity measurement is not required in general for this step. Preferably, however, the measurement using during table fill at step 26 is weighted less on the average than the measurement used in step 14 for codebook design.

At step 27, the index Wj assigned to the closest codebook vector at step 16 is then entered as the contents at the address corresponding to the input pair (Vj, V(j+1)). During operation of system T1, it is this index that is output by table T1 in response to the given pair of input values. Once indexes Wj are assigned to all 65,536 addresses of table T1, the design of table T1 is complete.

For second-stage table T2, the codebook design begins with step 11 of selecting training images, just as for first-stage table T1. The training images used for design of the table T1 codebook can be used also for the design of the second-stage codebook. At step 12, the training images are divided into 2×2 pixel blocks; the 2×2 pixel blocks are expressed as image vectors in four-dimensional vector space in a pixel domain; in other words, each of four vector values characterizes the intensity associated with a respective one of the four pixels of the 2×2 pixel block.

At step 13, the four-dimensional vectors are converted using a DCT to a spatial frequency domain. Just as a four-dimensional pixel-domain vector can be expressed as a 2×2 array of pixels, a four-dimensional spatial frequency domain vector can be expressed as a 2×2 array of spatial frequency functions:

| F00 | F01 |
|-----|-----|
| F10 | F11 |

The four values of the spatial frequency domain respectively represent: F00)—an average intensity for the 2×2 pixel block; F01)—an intensity difference between the left and right halves of the block; F10)—an intensity difference between the top and bottom halves of the block; and F11)—a diagonal intensity difference. The DCT conversion is lossless (except for small rounding errors) in that the spatial pixel domain can be retrieved by applying an inverse DCT to the spatial frequency domain vector.

The four-dimensional frequency-domain vectors serve as the training sequence for second-stage codebook design by the LBG/GLA algorithm. In general, the proximity measure is the same as that used for design of the codebook for table T1. The difference is that for table T2, the measurements are performed in a four-dimensional space instead of a two-dimensional space. Eight-bit indices Xj are assigned to the codebook vectors at step 15, completing codebook design procedure 10 of method M1.

Fill-in procedure 20 for table T2 involves entering indices Xj as the contents of each of the table T2 addresses. As shown in FIG. 1, the inputs to table T2 are to be eight-bit indices Wj from the outputs of table T1. These are received in pairs so that there are $2^8 * 2^8 = 2^{16} = 65,536$ addresses for table T2. Each of these must be filled with a respective one of $2^8 = 256$ table T2 indices Xj.

Looking ahead to step 26, the address entries are to be determined using a proximity measure in the space in which the table T2 codebook is defined. The table T2 codebook is defined in a four-dimensional spatial frequency domain space. However, the address inputs to table T2 are pairs of indices (Wj,W(J+1)) for which no meaningful metric can be applied. Each of these indices corresponds to a table T1 codebook vector. Decoding indices (Wj,W(J+1)) at step 22 yields the respective table T1 codebook vectors, which are defined in a metric space.

However, the table T1 codebook vectors are defined in a two-dimensional space, whereas four-dimensional vectors are required by step 26 for stage S2. While two two-dimensional vectors frequency domain can be concatenated to yield a four-dimensional vector, the result is not meaningful in the present context: the result would have two values corresponding to average intensities, and two values corresponding to left-right difference intensities; as indicated above, what would be required is a single average intensity value, a single left-right difference value, a single top-bottom difference value, and a single diagonal difference value.

Since there is no direct, meaningful method of combining two spatial frequency domain vectors to yield a higher dimension spatial frequency domain vector, an inverse DCT is applied at step 23 to each of the pair of two-dimensional table T1 codebook vectors yielded at step 22. The inverse DCT yields a pair of two-dimensional pixel-domain vectors that can be meaningfully concatenated to yield a four-dimensional vector in the spatial pixel domain representing a 2×2 pixel block. A DCT transform can be applied, at step 25, to this four-dimensional pixel domain vector to yield a four-dimensional spatial frequency domain vector. This four-dimensional spatial frequency domain vector is in the same space as the table T2 codebook vectors. Accordingly, a proximity measure can be meaningfully applied at step 26 to determine the closest table T2 codebook vector.

The index Xj assigned at step 15 to the closest table T2 codebook vector is assigned at step 27 to the address under consideration. When indices Xj are assigned to all table T2 addresses, design of table T2 is complete.

Table design method M1 for intermediate stages S2 and S3 are essentially similar except the dimensionality is doubled. Codebook design procedure 20 can begin with the selection of the same or similar training images at step 11. At step 12, the images are converted to eight-dimensional pixel-domain vectors, each representing a 4×2 pixel block of a training image.

A DCT is applied at step 13 to the eight-dimensional pixel-domain vector to yield an eight-dimensional spatial frequency domain vector. The array representation of this vector is:

| F00 | F01 | F02 | F03 |
| F10 | F11 | F12 | F13 |

Although basis functions F00, F01, F10, and F11 have roughly, the same meanings as they do for a 2×2 array, once the array size exceeds 2×2, it is no longer adequate to describe the basis functions in terms of differences alone. Instead, the terms express different spatial frequencies. The functions, F00, F01, F02, F03, in the first row represent increasingly greater horizontal spatial frequencies. The functions F00, F01, in the first column represent increasingly greater vertical spatial frequencies. The remaining functions can be characterized as representing two-dimensional spatial frequencies that are products of horizontal and vertical spatial frequencies.

Human perceivers are relatively insensitive to higher spatial frequencies. Accordingly, a perceptually weighted proximity measure might assign a relatively low (less than unity) weight to high spatial frequency terms such as F03 and F04. On the other hand, high spatial frequency information is relatively significant in distinguishing man-made versus natural objects in aerial photographs of terrain. Accordingly, a relatively high (greater than unity) weight can be assigned to high spatial frequency terms for classifications based on man-made versus natural distinctions.

Table fill-in procedure 20 for table T3 is similar to that for table T2. Each address generated at step 21 corresponds to a pair (XJ, X(J+1)) of indices. These are decoded at step 22 to yield a pair of four-dimensional table T2 spatial-frequency domain codebook vectors at step 22. An inverse DCT is applied to these two vectors to yield a pair of four-dimensional pixel-domain vectors at step 23. The pixel domain vectors represent 2×2 pixel blocks which are concatenated at step 24 so that the resulting eight-dimensional vector in the pixel domain corresponds to a 4×2 pixel block. At step 25, a DCT is applied to the eight-dimensional pixel domain vector to yield an eight-dimensional spatial frequency domain vector in the same space as the table T3 codebook vectors.

The closest table T3 codebook vector is determined at step 26, preferably using an unweighted proximity measure such as mean-square error. The table T3 index Yj assigned at step 15 to the closest table T3 codebook vector is entered at the address under consideration at step 27. Once corresponding entries are made for all table T3 addresses, design of table T3 is complete.

Table design method M1 for final-stage table T4 can begin with the same or a similar set of training images at step 11; however, the image blocks are handclassified to provide a standard against which different table designs can be evaluated. The training images are expressed, at step 12, as a sequence of sixteen-dimensional pixel-domain vectors representing the preclassified 4×4 pixel blocks (having the form of Bi in FIG. 1). A DCT is applied at step 13 to the pixel domain vectors to yield respective sixteen-dimensional spatial frequency domain vectors, the statistical profile of which is used to build the final-stage table T4 codebook.

A variation of the LBG/GLA algorithm described above is used at step 16 to determine 256 codebook vectors. Instead of using a proximity measure, as in step 14, a Bayes risk measure can be used. The Bayes risk corresponds to the risk of classification error. As with the proximity measure, the Bayes risk measure can be unweighted or weighted.

Risk weighting is used when the costs of classification errors are nonuniform. For example, in CT imaging, it is more costly to classify a tumor as healthy than it is to classify healthy tissue as a tumor. A proximity measure is used to group vectors. However, the Bayes risk is used to determine the class to which a group is assigned. Once again, the iterations stop when the reduction of Bayes risk from one iteration to the next falls below a predetermined threshold.

Once the final-stage table T4 codebook vectors are determined, class indices Z are assigned at step 17. Whereas tables T1, T2, and T3 use 256 eight-bit indices, table T4 uses fewer indices and requires fewer bits of precision to represent them. The number of table T4 indices is the number of distinct classes. If there are only two classes, a one-bit classification index can be used. If there are more classes, a longer fixed-length or variable-length class-index code can be used. The variable-length code can improve coding efficiency where the image vectors are unevenly distributed among codebook vector neighborhoods. To optimize coding efficiency with a variable-length final-stage index, the risk measure used in step 16 can be subject to an entropy constraint.

Fill-in procedure 20 for table T4 begins at step 21 with the generation of the $2^{16}$ addresses corresponding to all possible distinct pairs of inputs (Y1,Y2). Each third-stage index Yj is decoded at step 22 to yield the respective eight-dimensional spatial-frequency domain table T3 codebook vector. An inverse DCT is applied at step 23 to these table T3 codebook vectors to obtain the corresponding eight-dimensional pixel domain vectors representing 4×2 pixel blocks. These vectors are concatenated at step 24 to form a sixteen-dimensional pixel-domain vector corresponding to a respective 4×4 pixel block. A DCT is applied at step 24 to yield a respective sixteen-dimensional spatial frequency domain vector in the same space as the table T4 codebook. The closest table T4 codebook vector is located at step 26, using an unweighted proximity measure. The class index Z associated with the closest codebook vector is assigned to the table T4 address under consideration. Once this assignment is iterated for all table T4 addresses, design of table T4 is complete. Once all tables T1–T4 are complete, design of hierarchical table HLT is complete.

While the foregoing describes a particular classification system and a particular method, the invention provides for many variations. One important variable is the block dimensions in pixels required for satisfactory classification. More stages can be used for larger blocks, and fewer for smaller blocks. For example, six stages can be used for 8×8 blocks, such as those often used for text versus graphics classifications. In such cases, procedures for designing the codebooks and filling in the tables for the additional intermediate-stage tables can be extrapolated from the detailed method as applied to stages S2 and S3.

In addition, the number of stages can be decreased by increasing the number of table inputs (although this greatly increases the tables sizes). For example, a 2×2 block size can be handled by a single four-input table. In this case, the table is not hierarchical. In such a case, codebook design is similar to that of stage S4, while table fill-in is similar to that of stage S1.

The measures for variance, risk, and proximity used in steps 14, 16, and 26 can be varied. In general, unweighted proximity measures should be used for table fill-in to minimize classification error. However, weighted measures may give acceptable results. Where there is a known nonlinear perceptual profile available, one aspect of the invention requires that the proximity measure used in step 26 be on the average closer to unweighted than to the weighted measure corresponding to that nonlinear perceptual profile.

In codebook design, classification sensitive measures are preferred. Where there are distinct class-sensitive and perceptual profiles available, one aspect of the invention requires that the measures used in steps 14 and 16 be closer to the class-sensitive profile than to the perceptual profile.

However, the selection of measures for codebook design is different when the tables are used for joint classification and compression. Class and risk sensitive errors can be dismissed in favor of perceptual proximity measures where reconstruction of the original image is more critical than classification. In other cases, a weighted combination of class-sensitive and perceptual measures can be used for preliminary-stage codebook design at step 14. In addition, a weighted combination of risk and variance measures can be used for the design of a final-stage codebook. The following discussion explains how the present invention can be extended to cover various types of joint compression/classification. To accommodate a more sophisticated understanding, some change in notation is employed.

Classification and compression play important roles today in communicating digital information and their combination is useful in many applications. The aim is to produce image classification without any further signal processing on the compressed image. Presented below are techniques for the design of block-based joint classifier and quantizer classifiers/encoders implemented by table lookups. In the table lookup classifiers/encoders, input vectors to the encoders are used directly as addresses in code tables to choose the codewords with the appropriate classification information. In order to preserve manageable table sizes for large dimension VQ's, hierarchical structures that quantize the vector successively in stages are used. Since both the classifier/encoder and decoder are implemented by table lookups, there are no arithmetic computations required in the final system implementation. Both the classifier/encoder and the decoder are implemented with only table lookups and are amenable to efficient software and hardware solutions.

For efficient storage or transmission over a band-limited channel, the aim of an image compression algorithm is to maximize compression with minimal loss in visual quality. On the other hand, image classification can be used for assisting the human observers in differentiating among the various features of an image. Classification usually involves the application of sophisticated techniques to the entire image, but simple low-level classification involving small regions of an image can aid human observers by highlighting specific areas of interest. Classification of an image can also help in compression by using different compression algorithms for the different classes of data.

In some applications, the combination of compression and low-level classification is desirable. For example, the compression and classification of a digital medical image can enable a physician to view quickly a reconstructed image with suspected anomalies highlighted. See K. O. Perlmutter, S. M. Perlmutter, R. M. Gray, R. A. Olshen and K. L. Oehler, "Bayes risk weighted vector quantization with posterior estimation for image classification and compression," to appear *IEEE Tran.* IP, 1996.

Joint compression and classification is also useful for aerial imagery. Such imagery often entails large quantities of data that must be compressed for archival or transmission purposes and categorized into different terrains. Multimedia applications like educational videos, color fax and scanned documents in digital libraries, are rich in both continuous tone and textual data. See N. Chaddha, "Segmentation Assisted Compression of Multimedia Documents," 29th Asilomar Conference on Signals, Systems and Computers, November 1995. Since text and image data have different properties, joint classification here helps in the process of compression by choosing different compression parameters for the different kinds of data.

Vector quantization (VQ) is a lossy compression method in which statistical methods are applied to optimize distortion/bit-rate trade-offs. See A. Gersho and R. Gray, Vector Quantization and Signal Compression, Kluwer Academic Publishers, 1992. In the case of compression, distortion is usually measured by mean squared error subject to a constraint on the average bit-rate. With classification, the distortion is usually measured by the probability of error, or by Bayes risk. VQ has been applied successfully in the past for compression and low-level classification: see T. Kohonen, "An introduction to neural computing," *Neural Networks,* vol. 1, pp. 3–16, 1988; and G. McLean, "Vector Quantization for texture classification," IEEE Tran. in Systems, Man and Cybernetics, vol. 23, pp. 637–649, May/June 1993. VQ has also been applied successfully for joint compression/classification as shown by Perlmutter et al., *Ibid,* and K. L. Oehler and R. M. Gray, "Combining image compression and classification using vector quantization," *IEEE Trans.* PAMI, vol. 17, pp. 461–473, May 1995.

Full-search VQ is computationally asymmetric in that the decoder can be implemented as a simple table lookup, while the encoder must usually be implemented as an exhaustive search for the minimum distortion codeword. Various structured vector quantizers have been introduced to reduce the complexity of a full-search encoder; see Kohonen, cited above. One such scheme is hierarchical table-lookup VQ (HVQ); see P.-C. Chang, J. May and R. M. Gray, "Hierarchical Vector Quantization with Table-Lookup Encoders," Proc. Int. Conf. on Communications, Chicago, Ill., June 1985, pp. 1452–55. HVQ is actually a tablelookup vector quantizer which replaces the full-search vector quantizer encoder with a hierarchical arrangement of table lookups, resulting in a maximum of one table-lookup per pixel to encode.

Recent work on table-lookup vector quantization has been on combining it with block transforms with subjective distortion measures, see N. Chaddha, M. Vishwanath and P. Chou, "Hierarchical Vector Quantization of Perceptually Weighted Block Transforms," Proc. Data Compression Conference, March 1995. Combining it with wavelet transforms M. Vishwanath and P. A. Chou, "An efficient algorithm for hierarchical compression of video," Proc. Intl. Conf. Image Processing, Austin, Tex., November 1994, Vol. 3, pp. 275–279., applying it to low complexity scalable video coding N. Chaddha and M. Vishwanath, "A Low Power Video Encoder with Power, Memory, Bandwidth and Quality Scalability," to appear in VLSI-Design'96 Conference, Jan. 1996. and using it with finite-state VQ N. Chaddha, S. Mehrotra and R. M. Gray, "Finite State Hierarchical Table-Lookup Vector Quantization for Images," to appear Intl. Conf. on Acs., Speech and Sig. Proc., May 1996, to improve its rate-distortion performance.

In accordance with the present invention, joint image classification and compression are performed using tablelookups. These joint techniques include: a modification of a sequential classifier/quantizer taught by B. Ramamurthi and A. Gersho, "Classified Vector Quantization of Images," IEEE. Trans. Comm., COM-34, pp. 1105–1115, November 1986., a modified version of Kohonen's learning vector quantizer; a sequential quantizer/classifier; and Bayes VQ with posterior estimation. (See related discussion of the last three in Permutter, cited above.) The performance of the different techniques are investigated on computerized tomographic (CT) and aerial images. Thus gained are the advantages of these different techniques while maintaining the computational simplicity of table lookup encoding and decoding.

Hierarchical table-lookup vector quantization (HVQ) is a method of encoding vectors using only table lookups. It was used for speech coding by Chang et al., cited above, and recently extended for image coding. A straightforward method of encoding using table lookups is to address a table directly by the symbols in the input vector. For example, suppose each input symbol is pre-quantized to $r_0=8$ bits of precision (as is typical for the pixels in a monochrome image), and suppose the vector dimension is K=2. Then a lookup table with $Kr_0=16$ address bits and $\log_2 N$ output bits (where N is the number of codewords in the codebook) could be used to encode each two-dimensional vector into the index of its nearest codeword using a single table lookup. Unfortunately, the table size in this straightforward method gets infeasibly large for even moderate K. For image coding, K can be as large as 64, so that each 8×8 block of pixels can be coded as a single vector.

By performing the table lookups in a hierarchy, larger vectors can be accommodated in a practical way, as shown in FIG. 1. A K=16 dimensional vector at original precision $r_0=8$ bits per symbol is encoded into $r_M=8$ bits per vector (i.e., at rate $R=r_M/K=1$ bit per symbol for a compression ratio of 8:1) using M=4 stages of table lookups. In the first stage, the K input symbols are partitioned into blocks of size $k_0=2$, and each of these blocks is used to directly address a lookup table with $k_0 r_0=16$ address bits to produce $r_1=8$ output bits. Likewise, in each successive stage m from 1 to M, the $r_{m-1}$-bit outputs from the previous stage are combined into blocks of length $k_{m-1}$ to directly address a lookup table with $k_{m-1} r_{m-1}$ address bits to produce $r_m$ output bits per block. The $r_M$ bits output from the final stage M may be sent directly through the channel to the decoder, if the quantizer is a fixed-rate quantizer, or the bits may be used to index a table of variable-length codes, for example, if the quantizer is a variable-rate quantizer. In the fixed-rate case, $r_M$ determines the overall bit rate of the quantizer, $R=r_M/K$ bit per symbol, where $K=K_M=\Pi k_m$ is the overall dimension of the quantizer.

The computational complexity of the encoder is at most one table lookup per input symbol. The storage requirements of the encoder are $2^{k_{m-1} r_{m-1}} \times r_m$ bits for a table in the mth stage. If $k_m=2$ and $r_m=8$ for all m, then each table is a 64 Kbyte table, so that assuming all the tables within a stage are identical, only one 64 Kbyte table is required for each of the $M=\log_2 K$ stages of the hierarchy.

Clearly many possible values for $k_m$ and $r_m$ are possible, but $k_m=2$ and $r_m=8$ are usually most convenient for the purposes of implementation. For simplicity of notation, these values are assumes hereinunder. The sizes of the tables at different stages of the HVQ can be changed to provide a trade-off between memory size and PSNR performance. See N. Chaddha and M. Vishwanath, "A Low Power Video Encoder with Power, Memory, Bandwidth and Quality Scalability," to appear in VLSI-Design'96 Conference, January 1996.

The table at stage m may be regarded as a mapping from two input indices $i_1^{m-1}$ and $i_2^{m-1}$, each in $\{0,1,\ldots,255\}$, to an output index $i^m$ also in $\{0,1,\ldots,255\}$. That is, $i^m=i^m(i_1^{m-1}, i_2^{m-1})$. With respect to a distortion measure $dm(x, \hat{x})$ between vectors of dimension $K_m=2^m$, design a fixed-rate VQ codebook $\beta_m(i)$, $i=0,1,\ldots,255$ with dimension $K_m=2^m$ and rate $r_m/K_m=8/2^m$ bits per symbol, trained on the original data using any convenient VQ design algorithm, see Gersho et al., cited above. Then set $i^m(i_1^{m-1}, i_2^{m-1})=\mathrm{argmin}_i d_m((\beta_{m-1}(i_1^{m-1}), \beta_{m-1}(i_2^{m-1})), \beta_m(i))$ to be the index of the $2^m$-dimensional codeword closest to the $2^m$-dimensional vector constructed by concatenating the $2^{m-1}$-dimensional codewords $\beta(i_1^{m-1})$ and $\beta(i_2^{m-1})$. The intuition behind this construction is that if $\beta_{m-1}(i_1^{m-1})$ is a good representative of the first half of the $2^m$-dimensional input vector, and $\beta_{m-1}(i_2^{m-1})$ is a good representative of the second half, then $\beta_m(i^m)$, with $i^m$ defined above, will be a good representative of both halves, in the codebook $\beta_m(i)$, $i=0,1,\ldots,255$.

The general setup for the problem of compression and classification consists of a joint random process $\{X(n), Y(n): n=0,1,\ldots\}$, where the $X(n)$ are k-dimensional real-valued vectors and the $Y(n)$ designate membership in a class and take values in a set $H=\{0, 1, \ldots, M-1\}$. In the joint compression/classification problem, estimates of both the observed value X and its class Y, i.e., $(\hat{X},\hat{Y})$, must be obtained. A vector quantizer, when used for compression, is described by an encoder, $\alpha$, which maps the k-dimensional input vector X to an index $i \in I$ specifying which one of a small collection of reproduction vectors or codewords in a codebook $C=\{\hat{X}_i; i \in I\}$ is to be used for decompression; and a decoder, $\beta$, which maps the indices into the reproduction vectors, that is, $\beta(i)=\hat{X}_i$. When the VQ is used for classification, the system is also described by a classifier $\delta(i)=\hat{Y} \in H$, which attaches to each output index i a class label associated with class membership.

The quality of the reproduction $\hat{X}=\beta(\alpha(X))$ for an input X can be measured as a nonnegative distortion $d(X,\hat{X})$. The squared error distortion $d(X, \hat{X})=\|X-\hat{X}\|$ is a suitable measure. The average distortion $D(\alpha,\beta)=E[d(d(X,\beta(\alpha(X)))]$, is then the mean squared error (MSE). Assuming an N-codeword VQ and an M-class system, the quality of the classifier is measured by the empirical Bayes risk, $$B(\alpha, \delta) = \sum_{k=0}^{M-1}\sum_{j=0}^{M-1} C_{jk} P(\delta(\alpha(X)) = k, Y = j), \quad \text{or} \quad (1)$$

$$B(\alpha, \delta) = \sum_{i=0}^{N-1} P(\alpha(X) = i)) \sum_{k=0}^{M-1} 1(\delta(i) = k) \sum_{j=0}^{M-1} C_{jk} P(Y = j | \alpha(X) = i) \quad (2)$$

where the indicator function 1 (expression) is 1 if the expression is true and 0 otherwise. The cost $C_{jk}$ represents the cost incurred when a class j vector is classified as class k, where $C_{jk}=0$ when $j=k$. Thus, the goal in joint compression and classification is to minimize both MSE and Bayes risk within the HVQ framework.

Jointly optimization for compression and classification is achieved through the use of a modified distortion measure that combines compression and classification error via a Lagrangian importance weighting. The modified distortion measure is $$\rho_{\lambda,P}(x, \hat{x}, l) = \|x - \hat{x}\|^2 + \lambda \sum_{j=0}^{M-1} C_{jl} P(Y = l | x) \quad (3)$$

The fidelity criterion is thus $J_{\lambda,P}(\alpha, \beta, \delta)=E[\delta_{\lambda,P}]=D(\alpha, \beta)+\lambda B(\alpha,\delta)$, where D and B are defined above in equations (1) and (2) respectively. This weighted combination allows tradeoffs between priorities for compression and classification.

There are numerous approaches for joint classification and compression using a VQ. For example the quantizer and classifier can be designed independently and separately. Alternatively, a first stage can be designed to optimize one goal, and a second stage accepting the output of the first stage can be designed to optimize other goal. This would include a sequential design of quantizer then classifier or a sequential design of classifier then quantizer.

Two different sequential classifier/quantizer designs can be considered. In one case, the class information is also used to direct each vector, i.e. it is based on a classified VQ system. In the other case, a VQ-based classification scheme can be slightly modified to address the compression issue. Alternatively, with a more synergistic approach, one could seek simultaneously to accomplish both these objectives by reducing a measure of inhomogeneity that reflects errors of both compression and classification. Many of these approaches are described in Permutter, cited above. Herein, a subset of the methods is used to illustrate combined compression/classification using hierarchical table-lookup vector quantization.

To perform joint image classification and compression using HVQ, all intermediate tables are designed using the method for compression described above. The last-stage table can be designed for joint classification and compression by using the codebook designed from one of the methods described in this section. The last-stage table m in general can be regarded as a mapping from two input indices $i_1^{m-1}$ and $i_2^{m-1}$, each in $\{0,1,\ldots,255\}$, to an output index $i^m$ which can be used for purposes of compression and classification.

The table building can differ for the different methods. In some methods only squared error distortion will be used for building the last-stage table. In some other methods classification error (equation 2) is used for building the last-stage tables. In the remaining methods the modified distortion measure (equation 3) that combines compression and classification error via a Lagrangian importance weighting is used for building the last-stage table. The different algorithms for joint classification and compression with VQ are described below.

One approach is a sequential quantizer/classifier design. In this approach a full-search compression code is designed first using the generalized Lloyd algorithm to minimize MSE. A Bayes classifier is then applied to the quantizer outputs. Another approach is a sequential classifier/quantizer design in which the class information is used to direct each vector to a particular quantizer, i.e., it is based on a classified VQ system. A third approach is to use a VQ-based classification scheme and incorporate a small modification, a centroid step, to address the compression issue. Herein, Kohonen's LVQ (as cited above) is used as the classification scheme. It is a full-search design that reduces classification error implicitly—the codewords are modified by each vector in a way that is dependent upon whether the codeword shares the same class as the vector under consideration.

For the LVQ design, the codebook was initialized using the $LVQ_{13}$ PAK algorithm and then designed using the optimized learning rate method OLVQ1. Because the algorithm does not consider compression explicitly during codebook design, the encoder uses the codebook generated by the LVQ design only for classification purposes; a modified version of this codebook is then designed to produce the reproduction vectors. In particular, the encoder codewords that are produced by LVQ are replaced by the centroids of all training vectors which mapped into them; these codewords are then used for compression purposes. This technique will be referred to as centroid-based LVQ [1]. In simulations, the number of iterations used in the algorithm was equal to five times the number of training vectors.

Another approach is to use Bayes risk weighted vector quantization, a technique that jointly optimizes for compression and classification by using a modified distortion measure that combines compression and classification error via a Lagrangian importance weighting. The weighted combination allows trade-offs between priorities for compression and classification. The encoder selects the nearest neighbor with respect to the modified distortion measure (equation 3) to determine the best codeword representative.

In the full-search design, a descent algorithm that is analogous to the generalized Lloyd algorithm that sequentially optimizes the encoder, decoder, and classifier for each other is used. In the tree-structured design, the trees are grown by choosing the node that yields the largest ratio of decrease in average (modified) distortion to increase in bit rate, and then are pruned in order to obtain optimal subtrees. In the parametric case, the posterior probabilities can be computed. In the nonparametric case, considered herein, an estimate of the probabilities must be obtained.

Because the Bayes VQ is designed based on a learning set of empirical data, this same set can be used to estimate the posteriors during design. For example, the probability that a vector X has class 1 would be equal to the number of times the vector X occurred with the class label 1 over the number of times the vector X occurred in the training sequence. This method, however, does not provide a useful estimate of the conditional probabilities outside the training set.

There are a number of ways to obtain these posterior probabilities both inside and outside the training set. Herein, an external posterior estimator is used, and the resulting system is referred to as Bayes VQ with posterior estimation. It will be a cascade of two subsystems, where the second stage provides the codewords that consist of the pixel intensity vector and the class label, and the first stage provides the posteriors necessary for the implementation of the second system. Two different tree-structured estimators that can be used in conjunction with the other codebook are considered.

The first tree-structured estimator is based on a TSVQ. For each vector, MSE is used to determine the path down the tree until a terminal node is reached. The estimate of the posterior probability is subsequently determined by the relative frequencies of class labels within a node. The quality of this posterior estimating TSVQ is measured by how well the computed estimate approximates on the learning set. The "distortion" between probability measures used in node splitting and centroid formation is the average relative entropy. Thus, the distortion between the empirical distribution estimate and the estimated distribution is defined by the relative entropy. Further details on the construction and implementation of this posterior estimator TSVQ are described in by Permutter et al., cited above.

A decision tree can also be used to produce the posterior estimates mandated by the Bayes risk term by associating with each terminal node an estimate of the conditional probabilities. Given a number of features extracted from the vectors, the trees allow the selection of the best among a number of candidate features upon which to split the data. The path of the vector is determined based on the values of these features compared to a threshold associated with the node. The relative frequencies of the class labels within the terminal nodes then provide the associated posterior estimate. The trees are designed based on principles of the classification and regression tree algorithm CARTTM developed by Breiman et al.

The tree is constructed by using vectors consisting of eight features that are extracted from the vectors in the spatial domain. It is designed by using the Gini diversity of index for the node impurity measure and then pruned using a measure that trades off the number of terminal nodes of the tree with the within node Gini index to select the best subtree.

Immediately, below, HVQ is combined with block based VQ classifiers to constitute Joint Classification/Compression HVQ (JCCHVQ). Herein, JCCHVQ is applied to image coding. The encoder of a JCCHVQ consists of M stages (as in FIG. 1), each stage being implemented by a lookup table. For image coding, the odd stages operate on the rows while the even stages operate on the columns of the image. The first stage combines two horizontally adjacent pixels of the input image as an address to the first lookup table. This first stage corresponds to a 2×1 block vector quantization with 256 codewords. The rate is halved at each stage of the JCCHVQ.

The second stage combines two outputs of the first stage that are vertically adjacent as an address to the second-stage lookup table. The second stage corresponds to a 2×2 block vector quantization with 256 codewords where the 2×2 vector is quantized successively in two stages.

In stage i, the address for the table is constructed by using two adjacent outputs of the previous stage and the addressed content is directly used as the address for the next stage. Stage i corresponds to a $2^{i/2} \times 2^{i/2}$ block for i even, or a $2^{(i+1)/2} \times 2^{(i-1)/2}$ block for i odd, followed by vector quantizer with 256 codewords. The only difference is that the quantization is performed successively in i stages.

The last stage produces the encoding index u, which represents an approximation to the input vector and sends it to the decoder. This encoding index u also gives the classification information. The computational and storage requirements of JCCHVQ are same as that of ordinary HVQ described above.

The design of a JCCHVQ consists of two major steps. The first step designs VQ codebooks for each stage. Since each VQ stage has a different dimension and rate they are designed separately. The codebooks for all stages except the last stage are the same as used in HVQ.

The codebooks for each stage of the JCCHVQ except the last stage are designed by the generalized Lloyd algorithm (GLA) run on the training sequence. The first-stage codebook with 256 codewords is designed by running GLA on a 2×1 block of the training sequence. Similarly the stage i codebook (256 codewords) is designed using the GLA on a training sequence of the appropriate order for that stage. The codebook for the last stage is designed using one of the methods described above. The last-stage codebook can thus be a sequential quantizer/classifier, sequential classifier/quantizer, centroid-based LVQ or some form of Bayes risk weighted vector quantization.

The second step in the design of JCCHVQ builds lookup tables from the designed codebooks. The first-stage table is built by taking different combinations of two 8-bit input pixels. There are $2^{16}$ such combinations. The index of the codeword closest to the input for the combination in the sense of minimum distortion rule (squared error distortion) is put in the output entry of the table for that particular input combination. This procedure is repeated for all possible input combinations. Each output entry ($2^{16}$ total entries) of the first-stage table has 8 bits.

The second-stage table operates on the columns. Thus for the second stage the product combination of two first-stage tables is taken by taking the product of two 8-bit outputs from the first-stage table. There are $2^{16}$ such entries for the second-stage table. For a particular entry a successively quantized 2×2 block is obtained by using the indices for the first-stage codebook. The index of the codeword closest to the obtained 2×2 block in the sense of the squared error distortion measure is put in the corresponding output entry. This procedure is repeated for all input entries in the table.

All remaining stage tables except the last stage are built in a similar fashion by performing two lookups and then obtaining the raw quantized data. The nearest codeword to this obtained data in the sense of squared error distortion measure is obtained from the codebook for that stage and the corresponding index is put in the table.

The last-stage table is built using the codebooks obtained from one of the methods described above. Thus, for the last stage, the product combination of two previous-stage tables is taken by taking the product of two 8-bit outputs from the previous-stage table. There are $2^{16}$ such entries for the last-stage table. For a particular entry, a successively quantized block of the appropriate order is obtained by using the indices for the previous-stage codebook. The obtained raw data is used to obtain the index for joint classification/compression by using the last-stage codebook which can be a sequential quantizer/classifier, sequential classifier/quantizer, centroid-based LVQ or some form of Bayes risk weighted vector quantization. This procedure is repeated for all input entries in the table.

In the case of the sequential quantizer/classifier the last-stage table is built exactly in the same manner as the other stage tables by using the sequential quantizer/classifier codebook. Squared error is used as the distortion for designing the last-stage table. The squared error distortion measure $d_m(x, \hat{x})$ between vectors of dimension $K_m=2^m$ and a codebook designed using the sequential quantizer/classifier algorithm $\beta_m(i)$, with dimension $K_m=2^m$ are used here. Then set, $i_m(i_1^{m-1}, i_2^{m-1}) = \arg \min_i d_m((\beta_{m-1}(i_1^{m-1}), \beta_{m-1}(i_2^{m-1})), \beta_m(i))$ to be the index of the $2^m$-dimensional codeword $\beta_m(i)$ closest to the $2^m$-dimensional vector constructed by concatenating the $2^{m-1}$-dimensional codewords $\beta_{m-1}(i_1^{m-1})$ and $\beta_{m-1}(i_2^{m-1})$ for each entry in the table.

In centroid-based LVQ, squared error is used for encoding. Thus the last-stage table can be built in exactly the same manner as for the sequential quantizer/classifier algorithm by using the codebook designed using a modified version of Kohonen's LVQ algorithm.

In the case of the sequential classifier/quantizer, the last-stage table is built by using classification error (equation 2) obtained from a posterior estimation tree or a decision tree. For each entry $(i_1^{m-1}, i_2^{m-1})$ in the last-stage table, $i_m(i_1^{m-1}, i_2^{m-1})$ is obtained by using the $2^m$-dimensional vector constructed by concatenating the $2^{m-1}$-dimensional codewords $\beta_{m-1}(i_1^{m-1})$ and $\beta_{m-1}(i_2^{m-1})$, and classifying it to one of the classes. The classifier is based on classification error (equation 2) and is obtained either by applying a Bayes classifier to the output of a posterior estimator TSVQ that is designed using average relative entropy or by using a decision tree designed using the Gini diversity of index for the node impurity measure. The last-stage table also gives the index representing the quantized codeword for the class.

In the case of Bayes risk weighted vector quantization with posterior estimation, the last-stage table is built by using the modified distortion measure (equation 3) that combines compression and classification error via a Lagrangian importance weighting. The modified distortion measure (MSE and Bayes risk) $d_m(x,\hat{x})$ between vectors of dimension $K_m=2^m$ and a codebook designed using the Bayes risk weighted vector quantization with posterior estimation algorithm $\beta_m(i)$, with dimension $K_m=2^m$ are used here. Then for each entry $(i_1^{m-1}, i_2^{m-1})$ in the last-stage table, $i_m(i_1^{m-1}, i_2^{m-1})$ is set to the index arg $\min_i d_m((\beta_{m-1}(i_1^{m-1}), \beta_{m-1}(i_2^{m-1})), \beta_m(i))$ of the $2^m$-dimensional codeword $\beta_m(i)$ closest to the $2^m$-dimensional vector constructed by concatenating the $2^{m-1}$-dimensional codewords $\beta_{m-1}(i_1^{m-1})$ and $\beta_{m-1}(i_2^{m-1})$. Classification error (equation 2) is obtained by using a posterior estimator on the $2^m$-dimensional vector constructed by concatenating the $2^{m-1}$-dimensional codewords $\beta_{m-1}(i_1^{m-1})$ and $\beta_{m-1}(i_2^{m-1})$ and by using a TSVQ estimator designed using average relative entropy or by using a decision tree designed using the Gini diversity of index for the node impurity measure.

The last-stage table has the index of the codeword as its output entry which is sent to the decoder. The index can be used for both classification and compression purposes. The decoder has a copy of the last-stage codebook and uses the index for the last stage to output the corresponding codeword or class.

The different algorithms as applied to aerial images like that of FIG. 2A and CT images like that of FIG. 3A are evaluated below. There are two differences between the two image sources investigated. In the CT case, images have very unequal class probabilities and unequal class importance. With the aerial images, the two classes are more equal in a priori distribution and class importance.

The algorithms were used to compress an 8-bit per pixel (bpp) 512×512 aerial image and to identify regions as either man-made or natural. FIG. 2A presents a typical test image and FIG. 2B represents the hand-labeled classification for the aerial image. In the classified image, man-made regions are indicated in white whereas natural regions are indicated in black. The training sequence consisted of five aerial images of the San Francisco Bay Area provided by TRW. The image encoding was performed using 4×4 pixel blocks. Equal costs were assigned to the misclassification errors. The compression error was measured by $PSNR=10 \times \log_{10}(255 \times 255/MSE)$ and the classification error by the empirical Bayes risk. Since equal costs were used, the Bayes risk signifies the fraction of the total vectors that are misclassified.

The following methods were used for comparing the performance of the joint classification and compression using HVQ and VQ. A sequential TSVQ/classifier was designed for a rate of 0.5 bpp. A sequential classifier/TSVQ was designed for a rate of 0.5 bpp. A centroid-based LVQ was designed for rate of 0.5 bpp. A Bayes TSVQ with class probability tree was designed with eight spatial domain features for a rate of 0.5 bpp. A Bayes TSVQ with posterior estimating TSVQ was designed for a rate of 0.5 bpp.

The HVQ based methods perform around 0.5–0.7 dB in PSNR worse than the full-search VQ methods. These results are in agreement with the results presented in Chaddha et al. in reference 8. Table II gives the classification results on an aerial image for the different methods using VQ and HVQ. It can be seen that the classification performance of the different algorithms using HVQ is very close to that of the corresponding algorithms using VQ. Thus with table lookup encoding there is very small loss in classification performance. The encoding time for classification/compression using table-lookup was 30 ms on a SUN SPARC-10 Workstation for a 512×512 aerial image. Thus the encoding time is three to four orders of magnitude faster than the VQ based methods.

TABLE II

Classification Performance

| Method | Rate in bpp | Classification error for VQ based schemes | Classification error for VHQ based schemes |
|---|---|---|---|
| Sequential TSVQ/classifier | 0.5 | 29.56% | 32.24% |
| Sequential Classifier/TSVQ | 0.5 | 22.41% | 21.44% |
| Centroid-based LVQ | 0.5 | 19.58% | 19.77% |
| Bayes TSVQ with class prob. tree | 0.5 | 19.12% | 19.46% |
| Bayes TSVQ with post. est. TSVQ | 0.5 | 20.89% | 20.91% |

The performance of the algorithms is also evaluated as applied to a set of 512×512 12-bit grayscale CT lung images, where the goal is both to compress the images and to identify pulmonary tumor nodules. The training sequence consisted of ten images plus tumor vectors from five additional images; the additional tumor training vectors were added because of the low average percentage of tumor vectors in the data (99.85% of the training vectors were not tumor vectors). FIG. 3A presents a typical test image and FIG. 3B the hand-labeled classification for this image. In the classified image, tumor regions are highlighted in white. The image encoding was performed using 2×2 pixel blocks. In a two-class problem in which nontumors are assigned class 0 and tumors are assigned class 1, C10=100 and C01=1 are assigned to designate that missing a tumor is 100 times more detrimental than a false alarm.

The compression performance of the encoded images is measured by the SNR, where $SNR=10\times\log_{10}(D_0/D)$, D is the distortion measured by mean squared error, and $D_0$ is the distortion of the best zero rate code. The classification performance of the encoded images is measured by sensitivity and specificity. Sensitivity is the fraction of tumor vectors that are correctly classified while specificity is the fraction of nontumor vectors that are correctly classified. Sensitivity is particularly valuable in judging classification performance on the CT images because of the importance of identifying all suspicious regions.

The following methods are used for comparing the performance of the joint classification and compression using HVQ and VQ. A sequential full-search VQ/classifier was designed for a rate of 1.75 bpp. A sequential classifier/TSVQ was designed for a rate of 1.75 bpp. A Bayes full-search VQ with posterior estimating TSVQ was designed for a rate of 1.75 bpp. A Bayes TSVQ with posterior estimating TSVQ was designed for a rate of 1.75 bpp.

The HVQ based algorithms perform around 0.5–0.7 dB worse in SNR than the full-search VQ methods. Table III and Table IV give the classification results on a CT image for the different methods using VQ and HVQ. It can be seen that the classification performance of the different algorithms using HVQ is very close to that of the corresponding algorithms using VQ. Thus with table lookup encoding there is only a very small loss in classification performance. The encoding time for classification/compression using table-lookup was 20 ms on a SUN SPARC-10 Workstation for a 512×512 aerial image. Thus the encoding time is three to four orders of magnitude faster than the VQ based methods.

TABLE III

Classification Performance for VQ-based Methods

| Method | Sensitivity | Specificity |
|---|---|---|
| Sequential VQ/classifier | 81.06% | 96.56% |
| Sequential Classifier/TSVQ | 85.61% | 96.91% |
| Bayes full-search with post. est. TSVQ | 85.61% | 96.91% |
| Bayes TSVQ with post. est. TSVQ | 85.61% | 96.99% |

TABLE IV

Classification Performance for HVQ-based Methods

| Method | Sensitivity | Specificity |
|---|---|---|
| Sequential VQ/classifier | 80.30% | 96.51% |
| Sequential Classifier/TSVQ | 82.58% | 96.99% |
| Bayes full-search with post. est. TSVQ | 82.58% | 96.99% |
| Bayes TSVQ with post. est. TSVQ | 82.58% | 97.04% |

Herein are presented techniques for the design of block based joint classifier and quantizer classifiers/encoders implemented by table lookups. In the table lookup classifiers/encoders, input vectors to the encoders are used directly as addresses in code tables to choose the codewords with the appropriate classification information. Since both the classifier/encoder and decoder are implemented by table lookups, there are no arithmetic computations required in the final system implementation. They are unique in that both the classifier/encoder and the decoder are implemented with only table lookups, and they are amenable to efficient software and hardware solutions. These and other variations upon and modifications to the preferred embodiments are provided for by the present invention, the scope of which is limited only by the following claims.

What is claimed is:

1. An image classification and compression system comprising:
   conversion means for converting an image into a series of vectors defined in a multidimensional space, said image having elements classifiable among a set of classes;
   lookup table means for mapping said vectors many-to-one to indices, each of said indices identifying a respective one of said classes, said lookup table means being coupled to said conversion means for receiving said vectors and including:
   at least a first stage lookup table designed using a codebook design procedure incorporating block transforms; and
   a final stage lookup table designed using a tree structured codebook design procedure such that the vectors are mapped to the set of codes by successive utilization of the first stage lookup table and the final stage lookup table, wherein the final stage lookup table provides a pair of indices, one identifying image type, and the other for a codebook vector of a codebook having a weighted combination of classification optimized measures and compression optimized measures.

2. An image classification system as recited in claim 1 wherein the number of classes is less than or equal to the number of vectors.

3. An image classification system as recited in claim 1 wherein said lookup table means includes three stages of lookup tables.

4. An image classification system as recited in claim 1 wherein said lookup table means includes between two and six stages.

5. An image classification system as recited in claim 4 wherein each output of each stage is a function of at least two scalar inputs to that stage, said two scalar inputs being provided as outputs from the previous stage for all stages but a first of said stages.

6. An image classification system as recited in claim 1 wherein said lookup table indices has a classification component and a quantization component, said classification component identifying respective ones of said classes, said quantization component identifying a respective codebook vector.

7. An image classification system as recited in claim 1, wherein:
the series of vectors represented pairs of adjacent pixels of images; and
the vectors in the of the lookup table means are based on training images correlated to statical profiles of image to be classified.

8. An image classification system as recited in claim 1, wherein:
the series of vectors represent pairs adjacent pixels of images; and
the vectors in the tables of the lookup table means represent a precomputed transform of the multidimensional vectors representative of the pixels.

9. A method for classifying and compressing image elements, wherein image elements are represented by vectors for each pixel of the image element, the method comprising:
identifying a matrix of pixels;
identifying pairs of adjacent pixels of the matrix;
indexing into a multistage table based on pairs of vectors which represent the identified pairs of adjacent pixels to obtain an intermediate vector for each pair of vectors; and
successively combining pairs of intermediate vectors to index into further stages at least one of which contains information representative of image element classifications, wherein a final stage provides a pair of indices, one identifying image type, and the other for a codebook vector of a codebook having a weighted combination of classification optimized measures and compression optimized measures.

10. The method of claim 9 wherein the multistage table comprises a first stage having an error metric weighted to proximity characteristics of the pairs of vectors.

11. The method of claim 9 wherein the multistage table comprises a stage having an error metric weighted to reflect costs of classification errors.

12. The method of claim 11 wherein the error metric is weighted in accordance with a Bayes risk measure.

13. The method of claim 9 wherein the stages of the multistage table providing intermediate vectors have an error metric weighted to proximity characteristics, and wherein a final stage of the multistage table has an error metric weighted to reflect costs of classification errors.

14. The method of claim 9 wherein the multistage table comprises a preliminary section of stages to reduce the number of possible vectors that must be classified with minimal loss of information and a final stage to map the reduced number of vectors many to one to class indices which represent the class of the image element.

15. The method of claim 9 wherein the multistage table comprises a first stage lookup table used to generate an intermediate vector for each of the pairs of vectors representative of adjacent pixels.

16. The method of claim 15 wherein the pairs of intermediate vectors from the first stage are combined to represent sets of two by two matrix of pixels and are further used to index a second stage which provides further intermediate vectors.

17. The method of claim 9 wherein the vectors are transformed to a domain consistent with the domain of the vectors in the tables prior to being used to index into such tables.

18. A method for classifying and compressing image elements, wherein image elements are represented by vectors for each pixel of the image element, the method comprising:
identifying a matrix of pixels;
identifying pairs of adjacent pixels of the matrix;
indexing into a multistage table based on pairs of vectors which represent the identified pairs of adjacent pixels to obtain an intermediate vector for each pair of vectors; and
successively combining pairs of intermediate vectors to index into further stages at least one of which contains information representative of image element classifications, wherein a final stage of the further stages comprises a codebook having a weighted combination of classification optimized measures and compression optimized measures.

19. A computer readable medium having a data structure stored thereon for use in classifying and compressing multi pixel images represented by multidimensional vectors, comprising:
a first table of vectors representing pairs of adjacent pixels of the images;
a second table of vectors representing sets of two by two matrices of pixels, wherein the two by two matrices are comprised of pairs of adjacent pixels from the first table; and
a final table of class indices indexable by vectors of a previous table of vectors, wherein the final table provides a pair of indices, one identifying image type, and the other for a codebook vector of a codebook having a weighted combination of classification optimized measures and compression optimized measures.

20. The computer readable medium of claim 19 wherein the vectors in the tables are based on training images correlated to statistical profiles of images to be classified.

21. The computer readable medium of claim 19 wherein the vectors in the tables represent a precomputed transform of the multidimensional vectors representative of the pixels.

22. A data classification and compression system, comprising:
a vectorizer configured to convert data into a series of data vectors;
a classifier configured to select a class from a plurality of classes to which each data vector belongs, the classifier being coupled to the vectorizer for receiving the data vectors;
a hierarchical lookup table for each class configured to map each one of the data vectors in the class to a set of codes in a one-to-many relationship, wherein:
each lookup table is coupled to the classifier for receiving the classified data vectors;
the hierarchical lookup table comprises:
at least a first stage lookup table designed using a codebook design procedure incorporating block transforms; and a final stage lookup table designed using a tree structured codebook design procedure such that the data vectors are mapped to the set of codes by successive utilization of the first stage and final stage lookup tables, wherein the final stage lookup table provides a pair of indices, one identifying image type, and the other for a codebook vector of a codebook having a weighted combination of classification optimized measures and compression optimized measures.

23. The data classification and compression system of claim 22 wherein the data vectors in the tables are based on training images correlate to statistical profiles of images to be classified.

24. The data classification and compression system of claim 22 wherein the data vectors in the tables represent a precomputed transform of the multidimensional vectors representative of the pixels.

25. In a computer system, a method of classifying and compressing data, comprising:

receiving data as input;

converting the data into a series of data vectors;

selecting a class from a plurality of classes to which each data vector belongs, each class having a hierarchical lookup table configured to map each one of the data vectors in the class to a set of codes in a one-to-many relationship, wherein:

the hierarchical lookup table comprises:

at least a first stage lookup table designed using a codebook design procedure incorporating block transforms, and a final stage lookup table designed using a tree structured codebook design procedure such that the data vectors are mapped to the set of codes by successive utilization of the first stage and final stage lookup tables, wherein the final stage lookup table provides a pair of indices, one identifying image type, and the other for a codebook vector of a codebook having a weighted combination of classification optimized measures and compression optimized measures;

utilizing the hierarchical lookup table for the selected class, mapping the data vectors to the set of codes.

26. The method of claim 25 wherein the data vectors in the tables are based on training images correlated to statistical profiles of images to be classified.

27. The method of claim 25 wherein the data vectors in the tables represent a precomputed transform of the multidimensional vectors representative of the pixels.

* * * * *

UNITED STATES PATENT AND TRADEMARK OFFICE
CERTIFICATE OF CORRECTION

PATENT NO. : 6,404,923 B1
DATED : June 11, 2002
INVENTOR(S) : Chaddha

It is certified that error appears in the above-identified patent and that said Letters Patent is hereby corrected as shown below:

<u>Title page,</u>
Item [57], ABSTRACT,
Line 23, replace "DOC" with -- DCT --.

<u>Column 8,</u>
Line 61, replace "ore" with -- more --.
Line 62, insert -- a -- between "of" and "vector".

<u>Column 18,</u>
Line 61, replace "$LVQ_{13}$" with -- $LVQ\_$ --.

<u>Column 25,</u>
Line 14, replace "represented" with -- represent --.
Line 16, insert -- tables -- between "the" and "of".
Line 17, replace "statical" with -- statistical --.
Line 17, replace "image" with -- images --.
Line 21, insert -- of -- between "pairs" and "adjacent".

<u>Column 27,</u>
Line 13, replace "correlate" with -- correlated --.

Signed and Sealed this

Eighteenth Day of February, 2003

JAMES E. ROGAN
*Director of the United States Patent and Trademark Office*